United States Patent [19]
Rigal

[11] Patent Number: 5,857,338
[45] Date of Patent: Jan. 12, 1999

[54] SEAL SYSTEM FOR GEOTHERMAL POWER PLANT OPERATING ON HIGH PRESSURE GEOTHERMAL STEAM

[75] Inventor: Meir Rigal, Doar Na Avtah, Israel

[73] Assignee: Ormat Industries Ltd., Yavne, Israel

[21] Appl. No.: 766,932

[22] Filed: Dec. 16, 1996

Related U.S. Application Data

[63] Continuation of Ser. No. 531,281, Sep. 20, 1995, abandoned, which is a continuation of Ser. No. 99,337, Aug. 2, 1993, abandoned.

[51] Int. Cl.⁶ .................................................. F01B 31/00
[52] U.S. Cl. ........................... 60/657; 60/641.2; 415/112; 415/230
[58] Field of Search .......................... 60/655, 657, 641.2, 60/641.5; 415/111, 112, 230; 277/53, 17, 19

[56] References Cited

U.S. PATENT DOCUMENTS

| | | | |
|---|---|---|---|
| 1,246,039 | 11/1917 | Baumann ................................. | 60/657 |
| 1,431,485 | 10/1922 | Peck ....................................... | 362/419 |
| 2,298,824 | 10/1942 | Darley ..................................... | 362/219 |
| 3,906,730 | 9/1975 | Bellati et al. ............................ | 60/657 |
| 3,959,973 | 6/1976 | Meylan .................................... | 60/657 |
| 4,428,200 | 1/1984 | McCabe et al. ........................ | 60/641.5 |
| 4,454,569 | 6/1984 | Maguire ................................... | 362/216 |
| 4,517,804 | 5/1985 | Ura et al. ................................. | 60/657 |
| 4,542,625 | 9/1985 | Bronicki .................................. | 60/641.2 |
| 5,060,125 | 10/1991 | Cowie et al. ............................ | 362/217 |

FOREIGN PATENT DOCUMENTS

| | | | |
|---|---|---|---|
| 217002 | 9/1958 | Australia ................................. | 60/657 |
| 0372864 | 6/1990 | European Pat. Off. . | |
| 206543 | 12/1959 | Germany ................................. | 60/657 |
| 476842 | 9/1951 | Japan ...................................... | 362/217 |
| 4272603 | 9/1992 | Japan ...................................... | 362/147 |
| 4284302 | 10/1992 | Japan ...................................... | 362/147 |
| 4322002 | 11/1992 | Japan ...................................... | 362/217 |
| 838092 | 6/1960 | United Kingdom ..................... | 60/657 |

*Primary Examiner*—Hoang Nguyen
*Attorney, Agent, or Firm*—Donald M. Sandler

[57] ABSTRACT

A seal system for a geothermal power plant of the type having a steam turbine operating on high pressure steam produced from geothermal fluid includes a high pressure seal housing associated with the high pressure stage of the turbine. The housing has a first internal chamber for receiving geothermal steam that leaks from the high pressure stage, and a further internal chamber for receiving geothermal steam leaking from the first internal chamber. A condenser/vaporizer is provided for condensing steam from the further internal chamber using an organic fluid and producing condensate that can be disposed of in a re-injection well. Leakage of high pressure geothermal steam through the seal is suppressed because most of the leakage with be shunted to the condenser/vaporizer, which preferably is associated with a module that includes a steam turbine and an organic turbine coupled to a generator.

20 Claims, 4 Drawing Sheets

SEAL SYSTEM FOR GEOTHERMAL POWER PLANT OPERATING ON HIGH PRESSURE GEOTHERMAL STEAM

This application is continuation application of U.S. application Ser. No. 08/531,281, filed Sep. 20, 1995, now abandoned, which is a continuation application of U.S. application Ser. No. 08/099,337, filed Aug. 2, 1993, now abandoned.

TECHNICAL FIELD

This invention relates to a seal system for a geothermal power plant operating on high pressure geothermal fluid.

BACKGROUND OF THE INVENTION

Many geothermal sources currently under investigation or exploitation produce large quantities of hot brine at moderate pressures, typically about 150 psia. Some sources, however, produce fluid mixtures of steam and brine at much higher pressures, for example, 800 psia., or higher. In the latter cases, the brine is usually very corrosive giving rise to problems in its use and disposal. Recently, geothermal wells, e.g., in Hawaii, have been drilled producing high pressure geothermal fluid that is about 80% steam and 20% brine. The steam is usually only saturated, and there is some question as to whether these wells will maintain their present pressure in the face of continuous use over the years.

To take this uncertainty to account, it has been conventional to install pressure reducing valves into the flow from the well so that a low pressure steam system can be used in the expectation that the high pressure eventually will fall. However, this is a conservative design, and it is costly over the life of the plant, because a considerable amount of potential power will have been lost.

A back pressure steam turbine driving a generator would seem to be an alternative approach in that the high pressure steam from the well could be converted to lower pressure steam by the turbine and applied in parallel to a plurality of modules that can operate on low pressure steam. Each module may utilize a low pressure steam turbo-generator, and a condenser that acts as a vaporizer for an organic vapor turbo-generator. When the geothermal fluid produces high pressure, saturated steam, expansion of the steam in a turbine can take place in the wet region of the temperature-entropy diagram, producing exhaust steam that contains water droplets and is thus not suitable for application to the inlet stages of low pressure steam turbines in the various modules.

An improved approach is disclosed in copending patent application Ser. No. 07/955,454 filed Oct. 2, 1992 (the disclosure of which is hereby incorporated by reference). In this approach, a geothermal power plant operating on high pressure geothermal fluid includes a primary separator for separating the geothermal fluid into two channels, one containing high pressure steam and the other containing high pressure liquid. The high pressure steam expands in a primary steam turbine (called a back pressure steam turbine) for generating electricity and producing expanded high pressure steam. A secondary separator separates the expanded high pressure steam into an expanded steam component and a liquid component. A primary heat exchanger is responsive to the high pressure liquid for transferring heat to the expanded steam component thereby producing low pressure steam and cooled high pressure liquid.

At least one power plant module is provided which includes a low pressure steam turbine responsive to the low pressure steam for producing electricity and expanded low pressure steam; a condenser/vaporizer containing an organic fluid for receiving the expanded low pressure steam and converting it into condensate, and for vaporizing the organic fluid; an organic vapor turbine responsive to vaporized organic fluid produced by the condenser/vaporizer for generating electricity and for producing expanded organic fluid; a condenser for condensing the heat depleted organic vapor into a liquid; a preheater for heating said liquid; a pump for returning heated liquid from said preheater to said condenser/vaporizer; and a conduit for directing condensate from said condenser to said preheater.

While this approach precludes the application of wet steam to the steam turbines in the various modules of the power plant downstream of the back pressure turbine, it does not address another serious problem that arises because of the high pressure of the geothermal steam. This problem is leakage of geothermal steam through the seals of the back pressure steam turbine. Ordinarily, steam leakage is not a serious environmental problem; but geothermal steam, and particularly high pressure geothermal steam, usually contains a sizable percentage of noxious non-condensable gases such as hydrogen sulfide, and carbon dioxide, whose release into the ambient atmosphere causes serious environmental problems. As the steam pressure increases, the problem of seal leakage increases, and becomes so serious that continued plant operation can be jeopardized.

It is therefore an object of the present invention to provide a new and improved method of and apparatus for generating power from high pressure gases, and fluids as well, and capable of operating on high pressure geothermal fluid without substantially any significant release of noxious gases into the atmosphere.

BRIEF DESCRIPTION OF THE INVENTION

The present invention provides a seal system for a geothermal power plant of the type having a back pressure steam turbine operating on high pressure steam produced from geothermal fluid. The turbine has a high pressure stage and a low pressure stage; and the system of the invention includes a high pressure seal housing associated with the high pressure stage, the housing having a first internal chamber for receiving geothermal steam that leaks from said high pressure stage. The housing also includes a further internal chamber for receiving geothermal steam that leaks from the first internal chamber. A condenser/vaporizer is provided for condensing steam from the further internal chamber of the high pressure seal housing using an organic fluid and producing condensate that can be disposed of in a re-injection well.

If geothermal steam that leaks from the high pressure stage were vented to the ambient atmosphere, non-condensable, noxious gases entrained in the steam would be released to the atmosphere; and the higher the pressure in the high pressure stage, the greater would be the leakage. The present invention suppresses this because most of the leakage that does occur will be shunted to the condenser/vaporizer, which preferably is associated with a module that includes a condensing steam turbine and an organic turbine coupled to a generator. Expanded steam from the high pressure steam turbine is further expanded in the steam turbine of the module, and this further expanded steam is condensed in the condenser/vaporizer which serves to vaporize an organic fluid that is supplied to the organic turbine.

Leakage steam in the first internal chamber of the high pressure seal housing is applied to the exhaust stage of the back pressure turbine and is thus further expanded in the condensing turbines of the modules. All of the further expanded steam applied to the condenser/vaporizer is condensed, and the resultant condensate is returned to the ground via a re-injection well thereby preventing the release to the atmosphere of any noxious gases.

Preferably, the high pressure seal housing has a second internal chamber adjacent the further chamber; and means are provided for vaporizing water into clean, low pressure steam. Means are also provided for applying the clean, low pressure steam to the second chamber. In this arrangement, the clean, low pressure steam will have a pressure greater than the pressure in the further chamber of the housing with the result that clean, low pressure steam will leak into the further internal chamber where it will join with steam leaking from the first chamber. Thus, all of the geothermal steam leaking from into the high pressure seal housing will leak into either the first chamber or the further chamber, and substantially none will leak to the atmosphere. All of the clean, low pressure steam will leak either the further chamber or to the atmosphere. In addition, the system of the present invention returns all of the non-condensables in the leakage steam to the ground.

Finally, a comparable arrangement can be provided for controlling seal leakage from the low pressure stage.

BRIEF DESCRIPTION OF THE DRAWINGS

Embodiments of the present invention are shown by way of example in the accompanying drawings wherein.

DETAILED DESCRIPTION

Figure 1A:
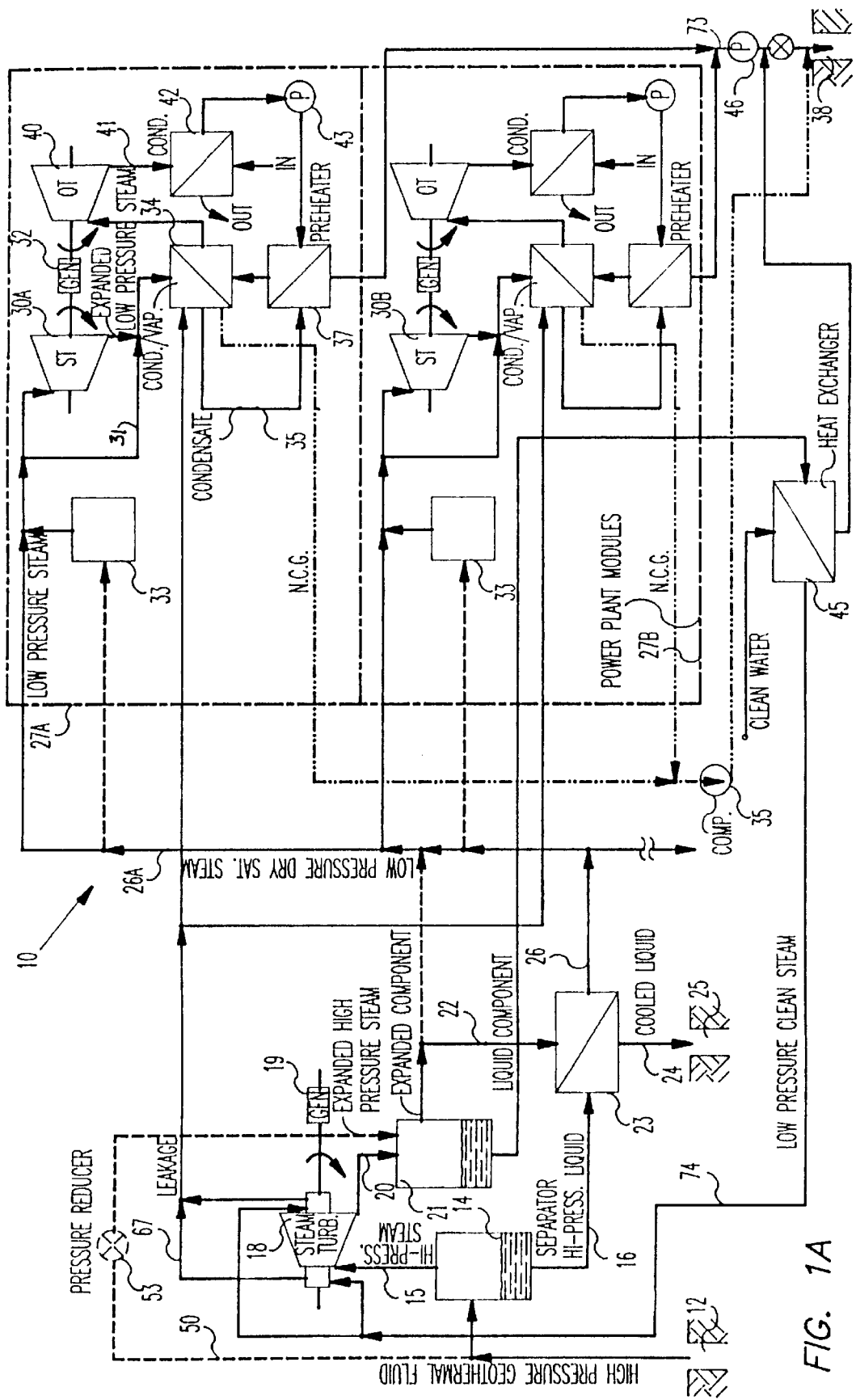
FIG. 1A is a block diagram of one embodiment of a geothermal power plant according to the present invention for operating with high pressure geothermal fluid.

Referring now to the drawings, reference numeral 10 designates a geothermal power plant according to the present invention operating on high pressure geothermal fluid. The geothermal fluid is supplied from production well 12 and typically produces geothermal fluid with a pressure in excess of about 800 psia, the fluid being a mixture of about 80% saturated steam and 20% concentrated brine. The composite fluid produced by well 12 is supplied to primary separator 14 which separates the fluid into two channels, a channel containing steam indicated by reference numeral 15 and a channel containing high pressure liquid indicated by reference numeral 16. The high pressure saturated steam in channel 15 is applied to high pressure back pressure steam turbine 18 which preferably is directly coupled to generator 19 such that the expansion of the high pressure steam in turbine 18 drives generator 19 which produces electricity supplied to an electrical grid (not shown).

The expanded steam is exhausted from turbine 18 through exhaust line 20, and can be supplied to secondary separator 21 for separating the exhaust into a steam component and a liquid component. The liquid component is applied to heat exchanger 45 whose operation is described below. The steam component, in a primary mode of operation, can be directed in parallel, to each of a plurality of power plant modules indicated by reference numerals 27A, 27B, etc. In the primary mode of operation, the steam component from separator 21 is applied directly through conduit 22 into primary heat exchanger 23 to which high pressure liquid in line 16 is also applied. In such case, a heat exchange process takes place within primary heat exchanger 23 wherein the high pressure liquid, which is at the well head temperature and pressure, is cooled and then delivered via conduit 24 to re-injection at well 25, for example, or to the means for effecting re-injection. The heat contained in the high pressure liquid is transferred to the steam component in line 22 thereby superheating or drying the steam component and producing low pressure dry steam which is supplied by the conduit 26 in parallel to each of a plurality of power plant modules indicated by reference numerals 27A, 27B, etc.

In a secondary mode of operation described below, when by-pass 50 is operative, the steam component produced by separator 21 is applied to dehumidifiers 33 before the steam is applied to the condensing turbines of the various modules.

In the primary mode of operation, low pressure, dry saturated steam, or superheated steam, in line 26 is applied to the inlet stage of condensing steam turbines 30A, 30B, etc. of the power plant modules 27A, 27B, etc. Optionally, in this mode, the steam may be applied first to dehumidifier 33. Only two modules are shown in FIG. 1, although in actual practice, it is contemplated that ten or more modules would actually be used. To facilitate a description of the present invention, details of only module 27A will be described.

Low pressure steam applied to the inlet of steam turbine 30A expands in the turbine producing expanded low pressure steam as some of the energy in the steam is converted, preferably, to electricity by reason of the coupling between steam turbine 30A and generator 32. The expanded steam exhausted from turbine 30A is applied to condenser/vaporizer 34 where condensation of the expanded steam takes place producing condensate in line 35. This condensate, and optionally, together with a portion of the liquid component produced by second separator 21, is applied to preheater 37 of the power plant module. After the condensate and the liquid component, if present, give up heat in the preheater, the cooled liquids are combined and disposed of in re-injection well 38.

Condenser/vaporizer 34 contains an organic fluid, preferably, pentane, or isopentane, according to prevailing ambient conditions, which is vaporized by the condensation of the low pressure steam on one side of the condenser. Vaporized organic fluid produced by the condenser/vaporizer is applied to organic vapor turbine 40 wherein expansion takes place producing heat depleted organic vapor in line 41 as organic turbine 40 drive generator 32.

Condenser 42 receives the heat depleted organic vapor exhausted from turbine 40; and the presence of a coolant in the condenser 42 condenses the heat depleted organic vapor to a liquid which is pumped by pump 43 back into the condenser/vaporizer through preheater 37 wherein the organic liquid is preheated before being supplied to condenser vaporizer 34. The coolant for condenser 42 may be air or may be liquid such as water.

The geothermal steam applied to the various modules is very rich in non-condensable gases; and to improve the heat transfer operation on the condenser/vaporizers, extraction of the non-condensable gases is necessary. As is conventional, non-condensable gases are withdrawn from the steam side of condenser/vaporizer 34 of module 27A and combined with non-condensables gases from the condenser/vaporizers of other modules. The combined gases are applied to compressor 35, and returned to re-injection well 38 preferably downstream of pump 46.

Finally, bypass line 31 associated with steam turbine 30A in module 27A is provided for permitting the steam turbine to be taken out of service for maintenance without seriously affecting the operation of organic vapor turbine 40 of the module.

FIG. 1 shows two re-injection wells, namely well 25 and well 38. However, it is possible to utilize a single re-injection well and this is particularly desirable where the cooled liquid in line 24 of the power plant is such that precipitation may take place during the cooling process. In such case, the almost pure water produced by the preheaters 37 of the power plant modules can be combined with the cooled liquid in line 24 in order to dilute the brine and thus inhibit precipitation during the transfer of the cooled liquid into the re-injection well.

In order to provide flexibility in the operation of the geothermal power plant shown in FIG. 1 for both maintenance purposes and to provide for the contingency of a reduction in pressure and temperature of the geothermal source fluid produced by production well 12, turbine 18 is bypassed by by-pass line 50 for the purpose of providing geothermal fluid from production well 12 directly to separator 21. To take account of the high pressure of well 12, pressure reducer 53 in line 50 is utilized. Thus, the pressure of the geothermal fluid applied to separator 21 is consistent with the exhaust pressure of condensing turbine 18 as well as the operating inlet pressure for the condensing steam turbines steam of the modules.

When line 50 is operative, steam turbine 18 may be shut down and separator 14 will be inoperative. Pressure reducer 53 will be effective to reduce the pressure to separator 21 which will divide the geothermal fluid into two streams much like primary separator 14 functions in connection with steam turbine 18. Thus, a low pressure steam component is supplied from separator 21 to the condensing turbines of the various modules, and a liquid component is supplied to heat exchanger 45 whose function is described below.

The main portion of each module operates as described before except that, usually, only condensate produced by the condenser/vaporizer is available for preheater 37. Usually, the brine component of the geothermal fluid in line 50 is so concentrated and corrosive that it may be impractical to apply this to the preheater. However, when conditions are appropriate, the brine component may be supplied to the preheater, the condensate produced by the condenser/vaporizer serving to dilute the concentrated brine to prevent precipitation in the preheater.

As indicated above, the advantage of having bypass line 50 in an actual plant is the flexibility that it provides during maintenance of steam turbine 18. Thus, this turbine can be taken out of operation by opening the bypass line and permitting the power plant modules to continue operation and remain on-line. Therefore, the total power produced by the power plant is reduced by reason of taking generator 19 off-line, but the power plant is still capable of producing a considerable amount of electricity. Of course, the modular nature of the power plant permits each of the individual modules 27A, 27B, etc. to be taken off line for maintenance purposes with only a small reduction in the output of the power plant.

Figure 1B:
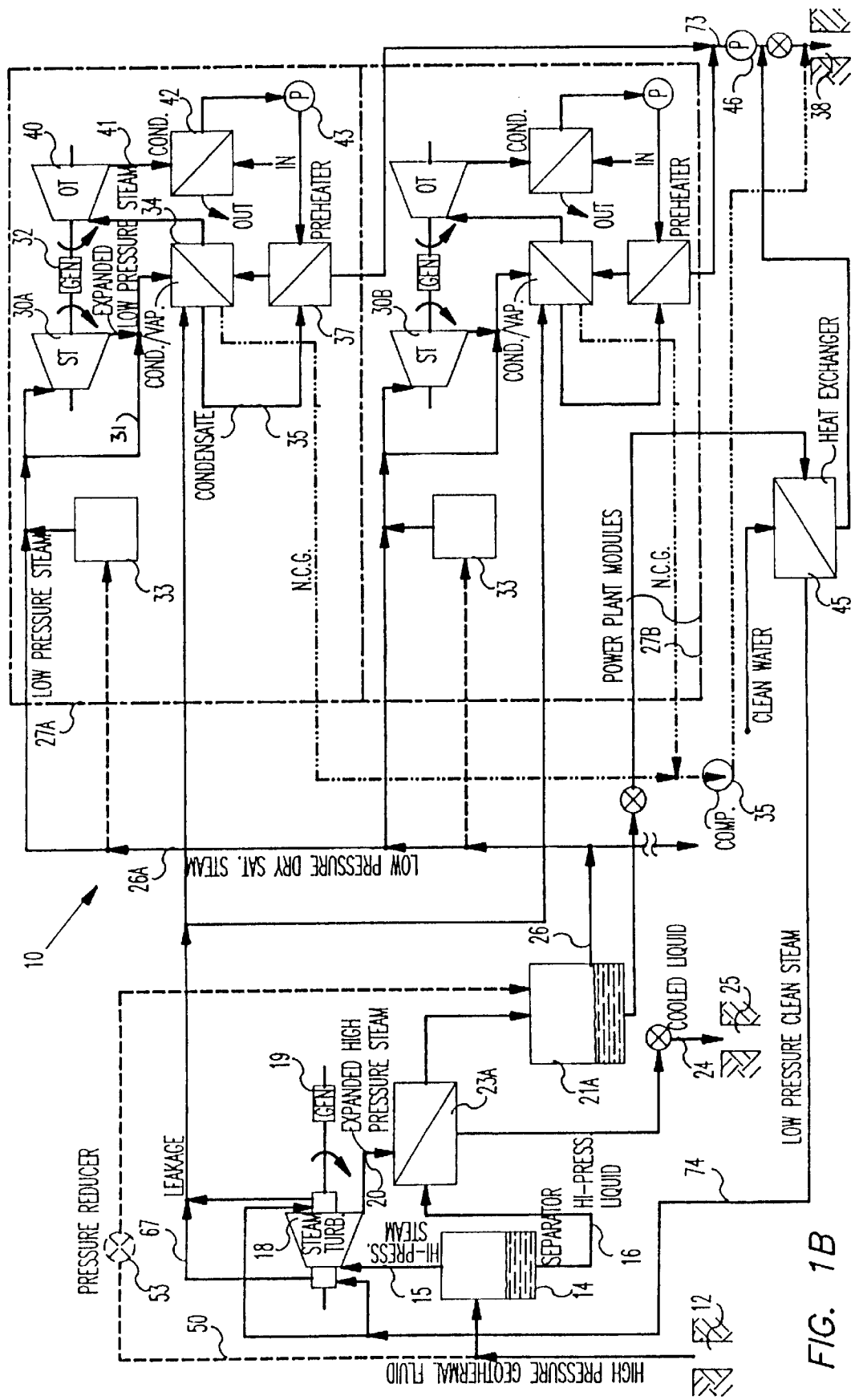
FIG. 1B is a block diagram of a second embodiment of a geothermal power plant according to the present invention for operating with high pressure geothermal fluid.

Embodiment 10A shown in FIG. 1B is similar to embodiment 10 shown in FIG. 1A, but in embodiment 1B, the order of separator 21 and heat exchanger 23 are interchanged. Specifically, as shown in FIG. 1B, the expanded high pressure steam in exhaust 20 of condensing turbine 18 is applied to heat exchanger 23A where the expanded high pressure steam is heated by high pressure geothermal liquid which is thereby cooled and then returned to well 25 via line 24. The heated expanded high pressure steam from heat exchanger 23A is applied to separator 21A which divides the flow into a steam component that flows in line 26 to the condensing steam turbines in the various modules, and a liquid component that flows to heat exchanger 45. Otherwise, the operation of the two embodiments is the same.

The high pressure of the geothermal steam supplied by separator 14 to back pressure turbine 18 will increase leakage through the seals associated with the turbine. If such steam is clean, i.e., contains no noxious non-condensables, the leakage is usually easily tolerated; but high pressure geothermal fluid will usually contain a high percentage of noxious non-condensable gases which are environmentally undesirable. Governmental regulations connected with licensing the use of geothermal fluids for power generation purposes often limit the amount of noxious gases permitted to be released from a geothermal power plant; and in the case of a high pressure geothermal source, seal leakage will usually result in the release into the ambient atmosphere of more than the maximum permissible amount of noxious gases.

Figure 2:
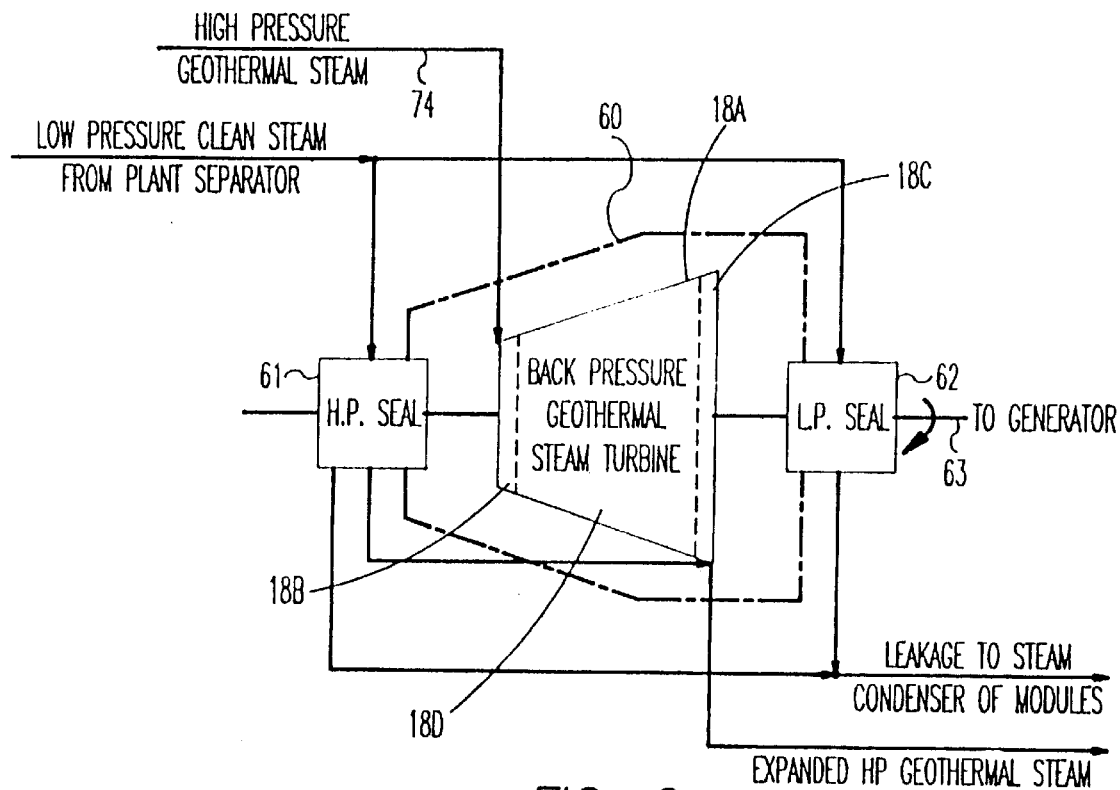
FIG. 2 is a schematic showing of a back-pressure steam turbine having a seal system in accordance with the present invention.

The present invention, which provides a system for controlling the release of non-condensable gases due to seal leakage, is shown in FIG. 2 applied to multi-stage, back pressure steam turbine 18A contained in turbine casing 60. Mounted on turbine shaft 63 are high pressure input stage 18B that receives high pressure steam from separator 14, various intermediate pressure stages collectively identified by reference numeral 18D, and low pressure exit stage 18C. The high pressure steam is applied to the input stage through a conventional nozzle arrangement (not shown), and expands through this and succeeding stages, including the exit stage. The expanded high pressure steam is exhausted from the turbine and applied to secondary separator 21, or heat exchanger 23, as the case may be, as described above.

Figure 3:
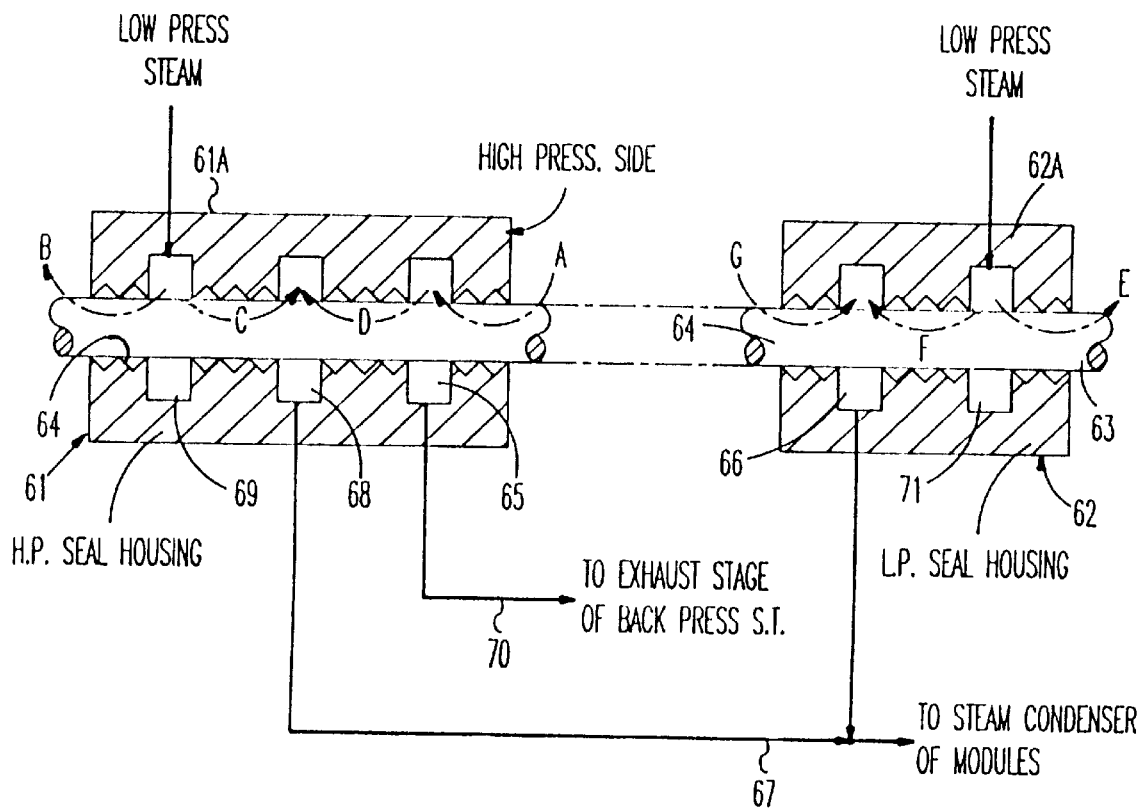
FIG. 3 is a more detailed showing of the seal system in accordance with the present invention.
Figure 4:
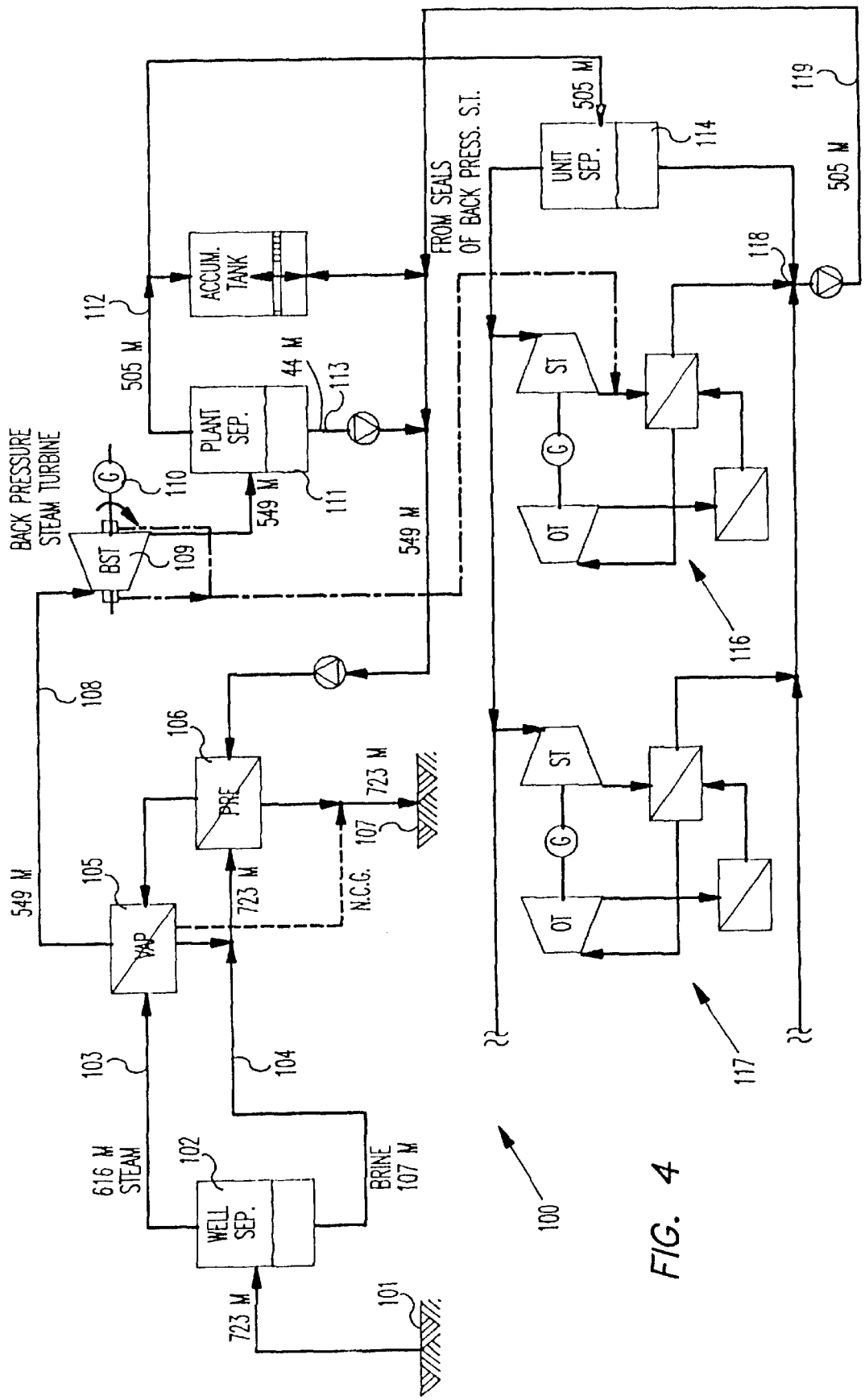
FIG. 4 is a block diagram of another embodiment of the invention.

High pressure seal 61 is associated with high pressure stage 18B and serves to impede leakage of high pressure steam from casing 60 around shaft 63 to the ambient atmosphere; and low pressure seal 62 associated with low pressure stage 18C serves to impede the leakage of expanded high pressure steam from casing 60 around shaft 63 to the atmosphere. As indicated in FIG. 3, seal 61 includes housing 61A having an axial bore that includes labyrinth portions 64 that closely fit turbine shaft 63, and first internal chamber 65. Seal 62 includes housing 62A having an axial bore that includes labyrinth portions 64 that closely fit shaft 63, and first internal chamber 66. Chamber 65, which is associated with high pressure stage 18B, receives high pressure steam that leaks past labyrinth portion 64 of seal 61; and chamber 66, which is associated with low pressure stage 18C, receives expanded high pressure steam that leaks past labyrinth portion 64 of seal 62.

In addition, high pressure seal 61 is provided with further chamber 68 for collecting steam that leaks past labyrinth portion 64 between chambers 65 and 68. Chamber 65 is connected as shown in FIG. 3 to the exhaust of back pressure steam turbine 18A for transferring at 70 high pressure steam leaking through labyrinth portion 64 to the exit of steam turbine 18A.

Each of chambers 66 and 68 is connected via piping 67 to condenser/vaporizer 34 of one or more of modules 27A, 27B, etc. The pressure in the condenser/vaporizer will be considerably below the pressure of both the high pressure steam leaking into chamber 68, and the expanded steam leaking into chamber 66. Most of the steam, indicated by arrow A, leaking from the high pressure side of casing 60, will flow directly to the exhaust of turbine 18A and then into one or more condenser/vaporizer of the modules where condensation takes place. In actual practice, each condenser/vaporizer 34 of the modules is purged of non-condensables in a conventional manner by withdrawing the gases, pressurizing them, and returning the pressurized gases to the condensate just prior to re-injection at well 38. Thus, non-condensables in the leakage reaching chambers 66 and 68 are returned to re-injection well 38 with the condensate.

Because atmospheric pressure is lower than the steam pressure, some additional leakage of steam beyond chamber 68 may occur. To contain such additional leakage through seal 61, housing 61A is provided with second internal chamber 69 downstream of chamber 68.

Clean low pressure steam is applied to second chamber 69 of seal 61. This steam will have a pressure in excess of atmospheric pressure and a portion indicated by arrow B will leak past labyrinth portion 64 to the atmosphere, and the remainder indicated by arrow C will leak into further chamber 68. This chamber will also receive leakage indicated by arrow D from first chamber 65. The leakage indicated by arrows C and D is sent via pipe 67 to condenser/vaporizers in the modules.

Finally, housing 62A of seal 62 is provided with second internal chamber 71 to which a source of clean steam is applied. Some of the clean steam, indicated by arrow E, leaks to the atmosphere, and some, indicated by arrow F leaks into chamber 66 where it combines with expanded high pressure steam that leaks into this chamber as indicated by arrow G.

Preferably, the source of clean, low pressure steam is derived from clean or treated water which is vaporized in heat exchanger 45 and supplied to second chamber 69 in high pressure seal housing 61, and to second chamber 71 of low pressure seal housing 62. The heat to effect the vaporization the clean water is derived from the liquid component of the output of separator 21 in embodiment 10, or separator 21A of embodiment 10A. The cooled liquid component leaving heat exchanger 45 may be disposed of by combining the liquid with the condensate in the condensate line 73 of the modules (upstream of the location at which compressed non-condensable gases extracted from the condenser/vaporizers are combined with the condensate to be returned to the ground via re-injection well 38). Heat exchanger 45 thus produces clean, low pressure steam that is substantially free of noxious gases.

In a second embodiment of the invention, which minimizes the release of noxious gases to the atmosphere, the steam loop is separate from the geothermal fluid loop. As shown in FIG. 3, in embodiment 100, high pressure geothermal fluid from well 101 is applied to well separator 102 which produces high pressure steam in line 103, and high pressure brine in line 104. The steam is applied to vaporizer 105 containing water which vaporizes as a result, the heat depleted steam the being combined with brine in line 104 and applied to preheater 106. The cooled geothermal liquid is then returned to re-injection well 107. In a conventional manner, non-condensable gases are extracted form vaporizer 105, compressed, and then combined with liquid geothermal liquid before being returned to the ground.

Steam produced by vaporizer 105 is applied via line 108 to the input of back pressure steam turbine 109 which preferably drives generator 110 and produces expanded steam that is applied to separator 111 which separates the expanded steam into two components, a steam component in line 112, and a liquid component in line 113. The steam component is applied to separator 114 which produces steam in line 115 which feeds a plurality of power plant modules 116, 117, etc. connected in parallel to line 115. Modules 115 are like modules 27A and 27B described above.

Condensed steam produced by the modules is collected and combined at 118 with liquid produced by separator 114 and returned via line 119 to preheater 106. Water in the preheater is heated and then applied to vaporizer 105 to produce steam for turbine 109. In embodiment 100, no non-condensable gases escape to the atmosphere.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed:

1. A seal system for a geothermal power plant of the type having a multi-stage steam turbine having a high pressure stage and a low pressure stage, and a separator for separating the geothermal fluid into two channels, one containing high pressure steam that is applied to said high pressure stage, and the other containing high pressure geothermal liquid, said system comprising:

a) a high pressure seal housing associated with said high pressure stage, and having a first internal chamber for receiving geothermal steam leaking from said high pressure stage, a further internal chamber for receiving geothermal steam leaking from said first internal chamber, and a second internal chamber arranged so that said further internal chamber is intermediate said first and second chambers;

b) a condenser/vaporizer for condensing steam from said further internal chamber using an organic fluid and producing condensate;

c) heat exchanger apparatus for transferring heat contained in said geothermal fluid to clean water which is vaporized into clean, low pressure steam; and d) means for applying said clean, low pressure steam to said second chamber of said high pressure seal housing whereby said clean low pressure steam leaks into said further chamber.

2. A seal system according to claim 1 including means for applying steam from said first internal chamber to said outlet of said exhaust stage of said back-pressure steam turbine.

3. A seal system according to claim 1 including:

a) a low pressure seal housing having a first internal chamber for receiving geothermal steam leaking from said low pressure stage; and b) means connecting said first internal chamber of said low pressure seal to said condenser/vaporizer for condensing steam from the last mentioned chamber, and producing condensate.

4. A geothermal power plant that operates on geothermal fluid comprising:

a) means responsive to said fluid for producing high pressure geothermal steam and high pressure geothermal liquid;

b) a back pressure steam turbine having a high pressure end and a low pressure end, said steam turbine being responsive to geothermal steam applied to said high pressure end for expanding said geothermal steam and producing electricity and expanded geothermal steam;

c) a condensing steam turbine for further expanding said expanded geothermal steam and producing further expanded geothermal steam;

d) a condenser/vaporizer containing an organic fluid for receiving said further expanded geothermal steam and converting it to a condensate, and for vaporizing said organic fluid;

e) an organic vapor turbine for expanding the vaporized organic fluid produced by said condenser/vaporizer and generating electricity and expanded organic vapor;

f) a condenser for condensing the expanded organic vapor into a liquid;

g) means for returning said liquid to said condenser/vaporizer;

h) a high pressure seal operatively associated with the high pressure end of said steam turbine for impeding the leakage of geothermal steam into the environment, said high pressure seal having a first internal chamber for receiving leaking geothermal steam, a further internal chamber for receiving geothermal steam leaking from said first internal chamber, and a second internal chamber arranged so that said further internal chamber is intermediate said first and second chambers;

i) means connecting said further internal chamber of said high pressure seal to said condenser/vaporizer for effecting the conversion of leaking high pressure geothermal steam to condensate; and j) a re-injection well for receiving said condensate;

k) heat exchanger apparatus for transferring heat contained in said geothermal fluid to clean water which is vaporized into clean, low pressure steam; and l) means for applying said clean, low pressure steam to said second chamber of said high pressure seal housing whereby said clean low pressure steam leaks into said further chamber.

5. A geothermal power plant according to claim 4 including a low pressure seal operatively associated with the low pressure end of said steam turbine for impeding the loss of geothermal steam to the environment, said low pressure seal having a first internal chamber for receiving leaking geothermal steam; and means connecting said first internal chamber of said low pressure seal to said condenser/vaporizer for effecting the conversion of leaking geothermal steam to condensate.

6. A geothermal power plant according to claim 5 wherein said low pressure seal has a second internal chamber, and including means for vaporizing water to produce clean, low pressure clean steam, and means for applying said clean, low pressure steam to said second internal chamber of said low pressure seal.

7. A geothermal power plant according to claim 6 including means for connecting said first chamber of said high pressure seal to the exhaust of said condensing steam turbine.

8. A geothermal power plant according to claim 6 wherein the pressure of said clean, low pressure steam is less than the pressure of said high pressure geothermal steam.

9. A geothermal power plant according to claim 4 wherein said condensing steam turbine and said organic vapor turbine constitute a module of the power plant, and each turbine is coupled to a common electric generator.

10. A geothermal power plant according to claim 9 wherein said generator is interposed between the condensing steam turbine and the organic vapor turbine.

11. A seal system according to claim 1 including a separator for separating said expanded high pressure steam into a steam component and a liquid component, and means for supplying said liquid component to said heat exchanger apparatus.

12. A seal system according to claim 1 including a heat exchanger responsive to said high pressure liquid for reheating said expanded high pressure steam and producing reheated expanded high pressure steam, a separator for separating said reheated expanded high pressure steam into a steam component and a liquid component, and means for supplying said liquid component to said heat exchanger apparatus.

13. A geothermal power plant according to claim 4 including a separator for separating said expanded high pressure steam into a steam component and a liquid component, and means for supplying said liquid component to said heat exchanger apparatus.

14. A geothermal power plant according to claim 4 including a heat exchanger responsive to said high pressure liquid for reheating said expanded high pressure steam and producing reheated expanded high pressure steam, a separator for separating said reheated expanded high pressure steam into a steam component and a liquid component, and means for supplying said liquid component to said heat exchanger apparatus.

15. A geothermal power plant according to claim 13 including a low pressure seal operatively associated with the low pressure end of said steam turbine for impeding the loss of geothermal steam to the environment, said low pressure seal having a first internal chamber for receiving leaking geothermal steam; and means connecting said first internal chamber of said low pressure seal to said condenser/vaporizer for effecting the conversion of leaking geothermal steam to condensate.

16. A geothermal power plant according to claim 15 wherein each of said high and low pressure seals has a second internal chamber, and including means for vaporizing water to produce clean, low pressure clean steam, and means for applying said clean, low pressure steam to said second internal chamber of each of said seals.

17. A geothermal power plant according to claim 15 wherein said further internal chamber of said high pressure seal is located between the first and second chambers of said high pressure seal for receiving leaking clean, low pressure steam and leaking high pressure geothermal steam, and means for connecting said first chamber to the exhaust of said steam turbine.

18. A geothermal power plant according to claim 13 wherein said condensing steam turbine and said organic vapor turbine constitute a module of the power plant, and each turbine is coupled to a common electric generator.

19. A geothermal power plant according to claim 13 wherein said generator is interposed between the condensing steam turbine and the organic vapor turbine.

20. A geothermal power plant according to claim 15 wherein the pressure of said clean, low pressure steam is less than the pressure of said high pressure geothermal steam.

* * * * *